United States Patent
Haddad et al.

(10) Patent No.: US 8,488,592 B2
(45) Date of Patent: Jul. 16, 2013

(54) UNIFIED SESSION DETAIL RECORDS

(75) Inventors: Justin W. Haddad, Merrimack, NH (US); Pradeep Kumar, Hudson, NH (US); Richard J. Schmidt, Merrimack, NH (US)

(73) Assignee: Aspect Software, Inc., Chelmsford, MA (US)

( * ) Notice: Subject to any disclaimer, the term of this patent is extended or adjusted under 35 U.S.C. 154(b) by 1477 days.

(21) Appl. No.: 11/890,016

(22) Filed: Aug. 3, 2007

(65) Prior Publication Data
US 2008/0056241 A1 Mar. 6, 2008

Related U.S. Application Data (60) Provisional application No. 60/835,375, filed on Aug. 3, 2006.

(51) Int. Cl.
*H04L 12/66* (2006.01)

(52) U.S. Cl.
USPC .............. 370/352; 379/9.04; 379/121.05; 379/266.1

(58) Field of Classification Search
USPC . 370/352–356, 231, 230.1, 466, 471; 379/69, 379/88.17, 201.01; 719/312, 328
See application file for complete search history.

(56) References Cited

U.S. PATENT DOCUMENTS

| 5,774,532 | A | 6/1998 | Gottlieb et al. |
|---|---|---|---|
| 2002/0176404 | A1* | 11/2002 | Girard ........................ 370/352 |
| 2003/0023714 | A1 | 1/2003 | Ziegler et al. |
| 2004/0086100 | A1* | 5/2004 | Moore et al. ............. 379/201.01 |
| 2006/0062208 | A1 | 3/2006 | Li et al. |
| 2006/0146792 | A1* | 7/2006 | Ramachandran et al. .... 370/352 |
| 2007/0041525 | A1* | 2/2007 | Tingley et al. ............. 379/88.17 |

FOREIGN PATENT DOCUMENTS
EP 1202528 A2 5/2002

OTHER PUBLICATIONS
International Search Report for Application No. PCT/US2007/017314, dated Mar. 3, 2008.

* cited by examiner

*Primary Examiner* — Melanie Jagannathan
*Assistant Examiner* — Justin N Mullen
(74) *Attorney, Agent, or Firm* — Husch Blackwell LLP (57) ABSTRACT

A unified session detail records of a multi-hop session is provided. The multi-hop session may be established through multiple nodes in a VoIP network. Each node may generate session detail records for the legs of the multi-hop session that are connected to the node. The nodes on the path of the multi-hop call may send the record to a single node to consolidate the session detail records of the legs of the multi-hop call in the single node so that the single node can provide unified session detail records of the multi-hop session. By providing unified session detail records, the user does not need to track down the nodes that are on the path of the multi-hop call to obtain the session detail records of the multi-hop session.

24 Claims, 8 Drawing Sheets

UNIFIED SESSION DETAIL RECORDS

RELATED APPLICATION

This application claims the priority to and the benefit of U.S. Provisional Application No. 60/835,375 filed on Aug. 3, 2006.

FIELD OF THE INVENTION

The present invention relates generally to a VoIP (Voice over Internet Protocol) environment, and more particularly to a method, system and medium for providing unified session detail records in the VoIP environment.

BACKGROUND OF THE INVENTION

Voice over Internet Protocol (VoIP) is a technology that allows a user to have telephone calls using an Internet connection rather than a traditional analog telephone connection. With VoIP the caller's voice signal is converted into a digital signal carried by IP packets that travel over the Internet. The digital signal is then converted back into a voice signal at the other end so that the caller can speak with a called party. VoIP uses the Internet as the transmission medium for telephone calls by sending voice data in packets using IP rather than by traditional circuit transmissions of the Public Switched Telephone Network (PSTN).

In a VoIP network or traditional PSTN networks, a user may place a multi-hop call that is transmitted through multiple nodes in the transmission network. In the conventional multi-hop calls, a central location produces the call records for the multi-hop call. When the multi-hop call has a problem, it is required to track down the central locations that have the call records of the multi-hop call. This process is inconvenient and time-consuming, and makes it difficult to perform a troubleshooting operation of a problematic multi-hop call.

SUMMARY OF THE INVENTION

The present invention provides unified session detail records of a multi-hop call or session. In the description of the present invention, call detail records and session detail records may be used to refer to the records of a telephone call, such as a calling party address, a called party address, a call start time, a call end time, a call duration, quality of service (QoS) statistics, etc. Session detail records may also be used to refer to the records of any type of sessions that can be created between parties, such as a text session and a chat session. The multi-hop call or session may be transmitted or established through multiple nodes in a VoIP network. Each node may switch or redirect the call so that the call can be forwarded to its destination. In the present invention, each node may generate session detail records for the legs of the multi-hop call or session that are connected to the node. The nodes on the path of the multi-hop call or session may send the records to a central collection point to consolidate and mediate the session detail records of the legs of the multi-hop call or session so that the central collection point can provide unified session detail records of the multi-hop call or session. By providing unified session detail records, the present invention enables a user to conduct an easy and efficient troubleshooting operation of a problematic multi-hop call or session, and hence the user does not need to track down the nodes on the path of the multi-hop call or session.

In accordance with one aspect of the present invention, a system is provided for consolidating records of a multi-hop session in a VoIP environment. The system includes a VoIP network for establishing the multi-hop session through at least a first node and a second node. The first node produces a first record of a first leg of the multi-hop session and the second node produces a second record of a second leg of the multi-hop session. In an exemplary embodiment, the node may produce a record for an ingress leg (a leg that enter the node) and a record for an egress leg (a leg that exits the node). The system also includes a process for consolidating the first record and the second record to provide unified records of the multi-hop session so that users access the unified records of the multi-hop session in a single node.

In accordance with another aspect of the present invention, a computer-implemented method is provided for consolidating records of a multi-hop session in a VoIP network. The multi-hop session is established through at least a first node and a second node in the VoIP network. A first record of a first leg of the multi-hop session is produced in the first node, and a second record of a second leg of the multi-hop session is produced in the second node. The first record and the second record are consolidated to provide unified records of the multi-hop session so that users access the unified records of the multi-hop session in a single node.

In accordance with another aspect of the present invention, a medium is provided for holding computer executable instructions for consolidating records of a multi-hop session in a VoIP network. The multi-hop session is established through at least a first node and a second node in the VoIP network. A first record of a first leg of the multi-hop session is produced in the first node, and a second record of a second leg of the multi-hop session is produced in the second node. The first record and the second record are consolidated to provide unified records of the multi-hop session so that users access the unified records of the multi-hop session in a single node.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention provides unified session detail records for a multi-hop call in a telecommunication environment. The illustrative embodiment will be described relative to a VoIP (Voice over Internet Protocol) environment where an Internet connection is used as a call transmission media. Those of skill in the art will appreciate that the VoIP environment is illustrative, and the unified session detail records may be provided in other telecommunication environments using a different transmission media, such as the Public Switched Telephone Network.

In the illustrative embodiment, a multi-hop call may be transmitted through multiple nodes over the Internet. Each node may include a server for switching or redirecting the multi-hop call so that the multi-hop call can be forwarded to its destination. The server in each node may generate session detail records of the legs of the multi-hop call that are connected to the node. The server may send the session detail records to a single node to consolidate the session records so that the single node can provide unified session detail records of the multi-hop call. Those of ordinary skill in the art will appreciate that the node is not limited to a server, and may include other switching facilities, such as a router.

Although exemplary embodiments are described in connection with telephone calls, the session detail records may be created and consolidated for any type of sessions that can be created between parties, such as a text session and a chat session.

Figure 1:
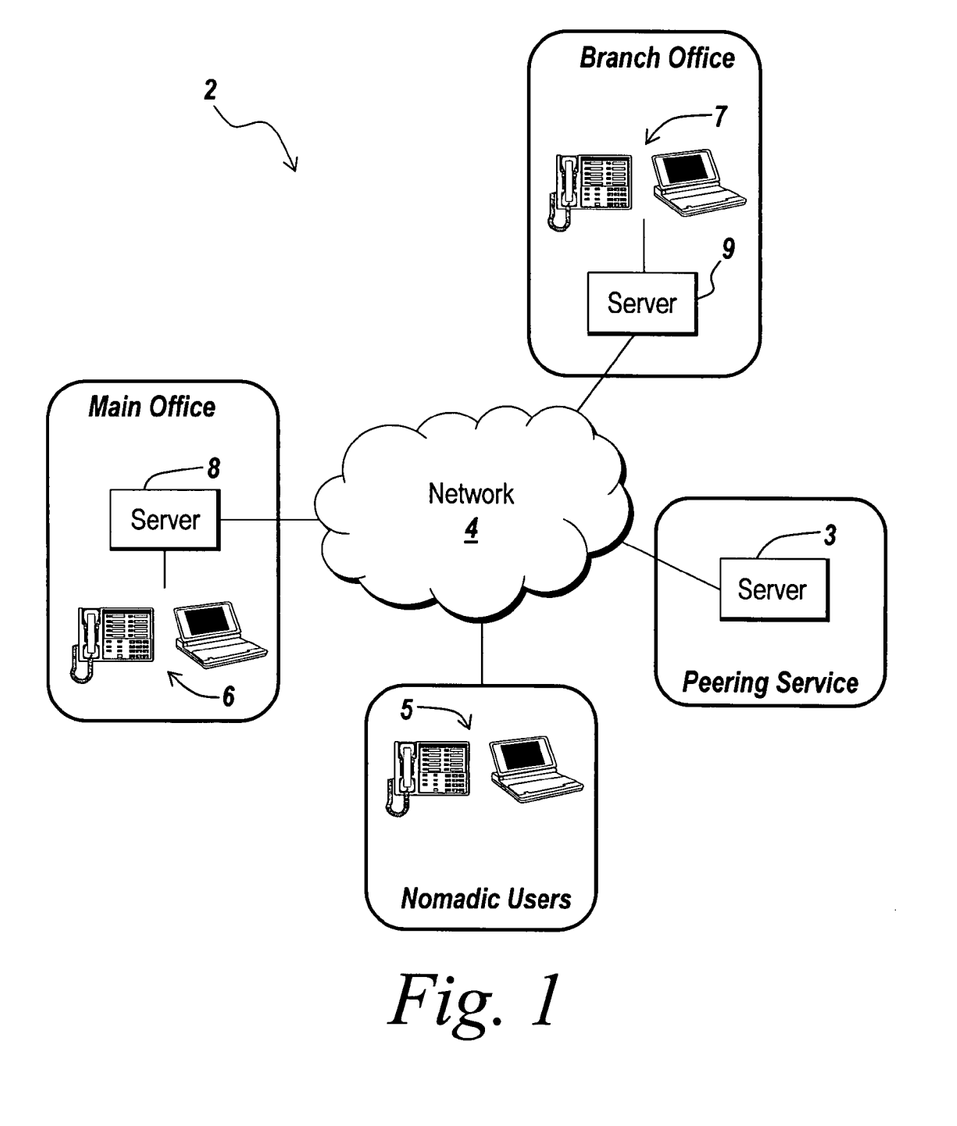
FIG. 1 depicts an exemplary VoIP environment suitable for practicing the illustrative embodiment of the present invention.

FIG. 1 is an exemplary VoIP environment 2 suitable for practicing the illustrative embodiment of the present invention. The VoIP environment 2 may include one or more servers 3, 8 and 9 coupled to clients 5, 6 and 7 via a call transmission network 4. The call transmission network 4 forwards a call placed by a calling party to its destination where a called party is located. The illustrative embodiment uses the Internet for the call transmission network. In other embodiments, the call may be transmitted through intranet, LAN (Local Area Network), WAN (Wide Area Network), MAN (Metropolitan Area Network), wireless network (e.g., using IEEE 802.11 and Bluetooth), and the combination thereof.

In the VoIP environment 2, the clients 5, 6 and 7 may reside on a phone or a computer to enable the calling party to place a call or the called party to receive a call. In the illustrative embodiment, when a user may place a call on the client 6 in the main office, the server 8 may direct the call to another user in the main office or to a nomadic user 5 on the network 4. In another instance the servers 8 and 9 may direct the call to the client 7 in the branch office. The call may be directed using a server 3 in a peering service provider, such as VONAGE™. The server may set up a session between the clients using Session Initiation Protocol (SIP). SIP is a protocol for initiating, modifying, and terminating an interactive user session that involves multimedia elements, such as video, voice, instant messaging, online games, and virtual reality. SIP allows the use of network elements, such as Proxy Servers and User Agents, to provide familiar telephone-like operations: dialing a number, causing a phone to ring, hearing ringback tones or a busy signal. SIP acts as a carrier for the Session Description Protocol (SDP), which describes the media content of the session, such as the IP ports to use, the codec being used etc. SIP is used in setting up and tearing down a session between the clients 6 and 7 in the illustrative embodiment. Those of ordinary skill in the art will appreciate that SIP is an illustrative signaling protocol and the present invention may employ a different protocol, such as H.323 protocol, in other embodiments.

After the session is set up between the clients, the content of the call including voice and/or video signals are transmitted over the Internet using Real-time Transport Protocol (RTP). RTP defines a standardized packet format for the real-time delivering of audio and video signals over the Internet. RTP carries the actual voice or video content of the call in real-time. In the illustrative embodiment, the term "session" is used to refer to the packet stream of the RTP.

Figure 2:
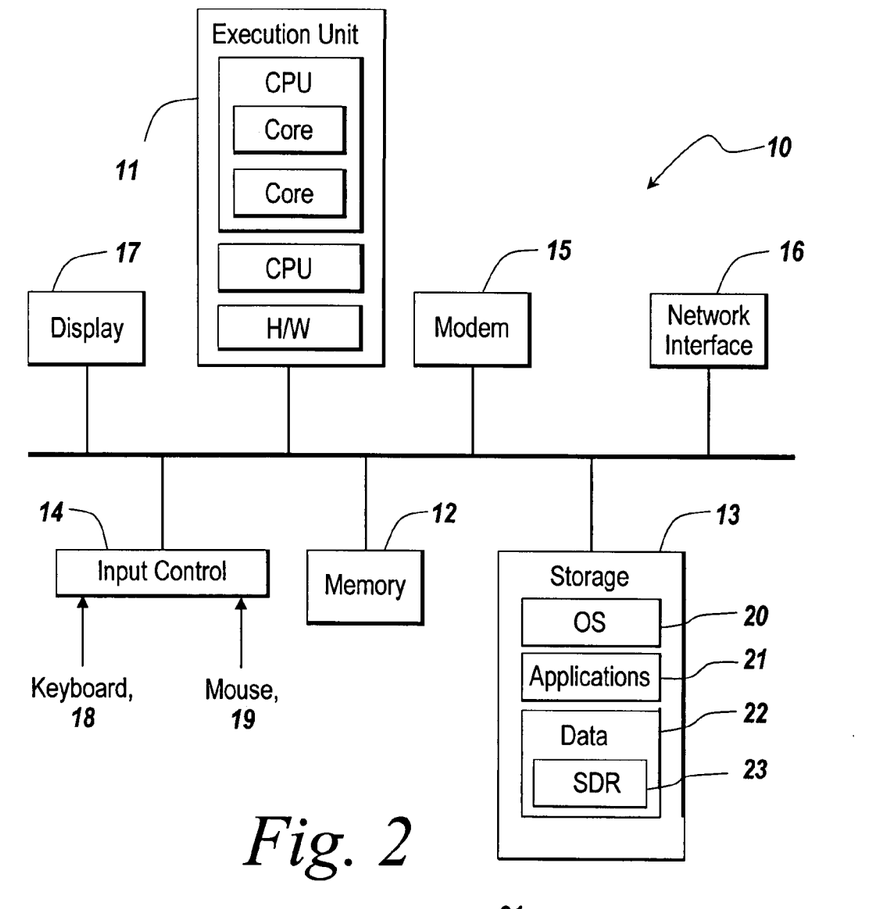
FIG. 2 show an exemplary computing device for implementing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, a display 17, etc. The execution unit 11 controls each component of the computing device 10 to provide the VoIP environment 2. The memory 12 temporarily stores instructions and data and provides them to the execution unit 11 so that the execution unit 11 operates the computing device 10.

Optionally, the computing device 10 may include multiple Central Processing Units (CPUs) for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC).

The storage 13 usually contains software tools for applications. The storage 13 includes, in particular, code 20 for the operating system (OS) of the device 10, code 21 for applications running on the operation system to provide the VoIP environment 2, and data 22, for example, the session detail records 23. The applications will be described below in more detail with reference to FIG. 3. Those of ordinary skill in the art will appreciate that the application can be stored in the memory 12 as well, much like the data, and even the OS, or they can be stored on the network described below with reference to FIG. 1.

The input control 14 may interface with a keyboard 18, a mouse 19, and other input devices. The computing device 10 may receive input data through the input control 14. The computing device 10 may display on the display 17 user interfaces 9 for displaying the session detail records of calls. The modem 15 and network interface 16 enables the client 6 and 7 to communicate with each other through the servers 8 and 9 in the network 4.

Figure 3:
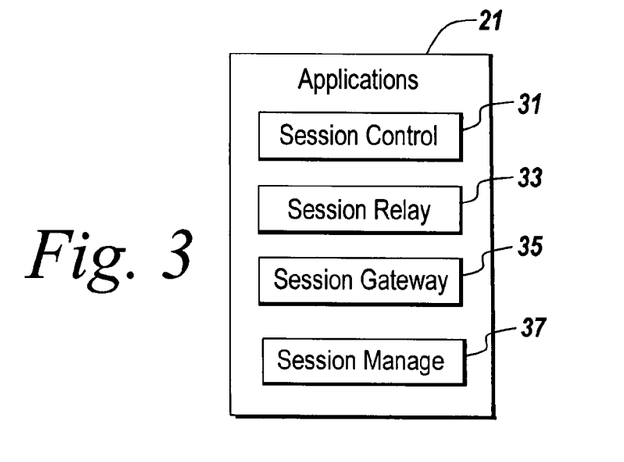
FIG. 3 shows exemplary applications that are part of the VoIP environment in the illustrative embodiment.

FIG. 3 shows exemplary applications provided in the illustrative embodiment for the VoIP environment 2. The applications 21 may include a set of modular software components, such as session control 31, session relay 33, session gateway 35 and session manage 37, that can be combined into discrete functional packages. Examples of the applications 21 can be found in SessionSuite™ from BlueNote Networks, Inc. of Tewksbury, Mass.

The session control 31 is a control agent and contains registrar and location databases. The clients 6 and 7 (in FIG. 1) may register with a local session control 31 in the servers 8 and 9 (in FIG. 1) so that the servers 8 and 9 can determine the locations of the clients 6 and 7. When the clients 6 and 7 register with the session control 31, the locations of the clients 6 and 7 are stored in the location databases in the servers 8 and 9. The session control 31 may set up or tear down the session between the clients 6 and 7 using the SIP protocol. The session control 31 may generate and maintain session detail records of a call between the clients 6 and 7.

The session relay 33 provides the media based services, such as transcoding, recording, lawful intercept, etc. The session relay 33 may supply compression and transcoding and support a plurality of codecs including G.711, G729a, G.729b, and GSM for voice, and H.263 and H.264 for video. The session relay 33 may also provide recording services for recording the session between the clients 6 and 7. The call recordings may be stored locally on the session relay 33. The recording of the session will be described below in more detail with reference to FIGS. 4-7.

The session control 31 may provide Quality of Service (QoS) statistics and MOS (Mean Opinion Score) scores of the session between the clients 6 and 7. The QoS statistics may include the latency of a packet passing the session relay 33 in the network 4. The QoS statistics may also include noise levels and loudness levels of the signals passing the session relay 33. The MOS scores may provide a numerical indication of the perceived quality of received media after compression and/or transmission. The MOS may be expressed as a single number in the range 1 to 5, where 1 is lowest perceived quality, and 5 is the highest perceived quality. The session relay 33 may forward the QoS statistics and the MOS scores to the session control 31 so that session control 31 can include the QoS statistics and MOS scores in the session detail records. The session detail records and the QoS statistics will be described below in more detail with reference to FIGS. 4-7

The session gateway 35 bridges a VoIP network and traditional PSTN/PBX infrastructures, and allow a user to place and receive a call with a PBX user or a user of the PSTN network. The session gateway 35 works with standard-based third party analog and digital line adaptors, supporting a variety of interfaces including ISDN, T1/E1 Channel Associated Signaling (CAS), PBX inter-working and Foreign Exchange Office/Subscriber (FXO/S) incorporation. With the session gateway 35, a user can migrate to VoIP, while using the traditional PBX and maintaining communications with the public telephone infrastructure.

The session manage 37 manages the application components. The session manage may be a Web-based application for managing the VoIP services, resources, sessions, users and clients. The session manage may provide a common Web Browser interface for managing the application components and integrating fault, configuration, performance, and security management for the VoIP functions. The session manage may allow a user to manage call handling and voice mail features through a secure Web Browser. The session manage may provide an XML/SOAP interface for integration with third-party or customer-developed management applications and systems. The session manage 37 may provide an interface for displaying session detail records 23 to the user. A process on the session manage 37 may collect the session detail records stored on the various components and perform the consolidation/mediation operations to stores the result in the session manage database. The process running on the session manage 37 may also read off the call recordings stored on the session relay 33 and mediate along with the session detail records in the database.

Figure 4:
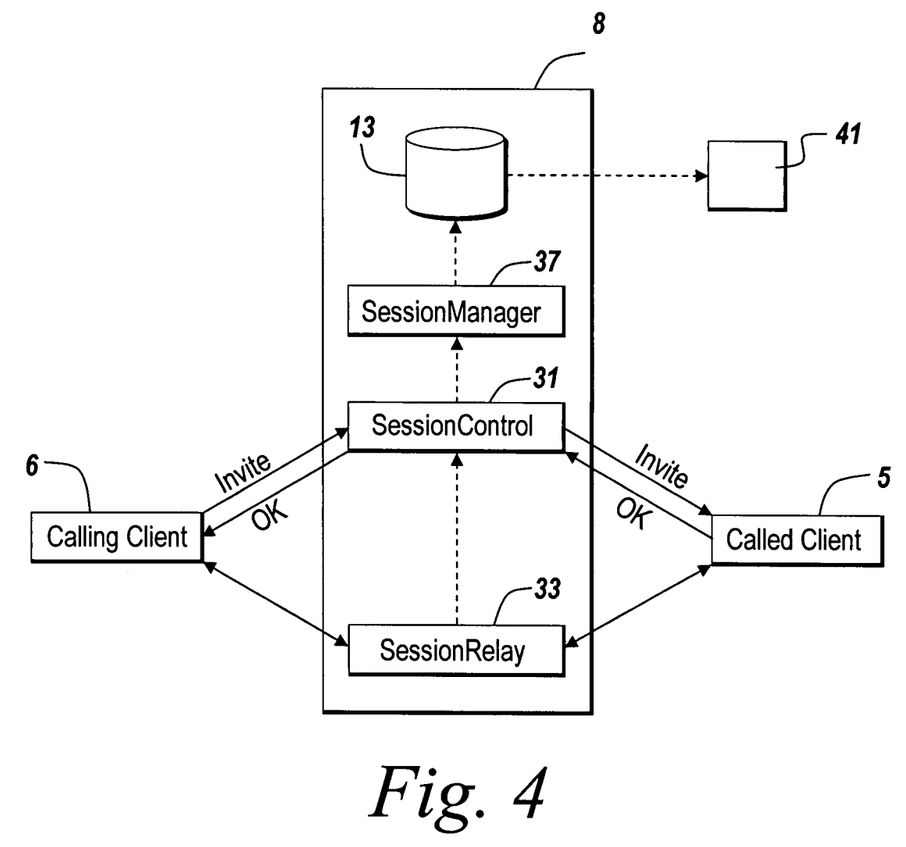
FIG. 4 depicts an exemplary configuration of the VoIP call connection in the illustrative embodiment.
Figure 6:
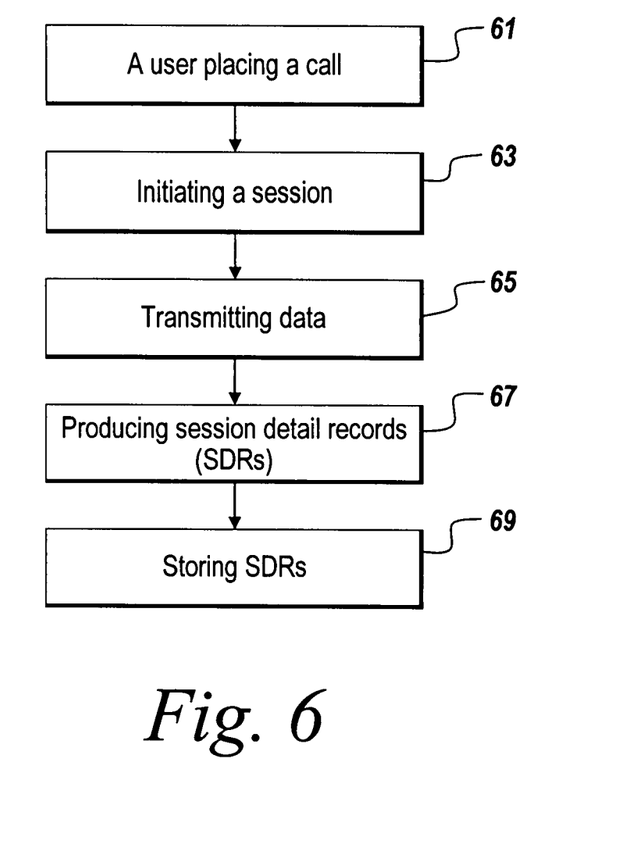
FIG. 6 is a flow chart showing an exemplary operation of the illustrative embodiment depicted in FIG. 4.

FIG. 4 shows an exemplary configuration in which a call is set up between the clients 5 and 6 in the illustrative embodiment, and FIG. 6 is a flow chart showing an exemplary operation of the illustrative embodiment depicted in FIG. 4. In the illustrative embodiment, the clients 5 and 6 may register with the session control 31 in the server 8. When a user places on the client 6 a call to a party who receives the call on the client 5 (step 61), the session control 31 may set up a session between the clients 5 and 6 using the SIP protocol (step 63). The client 6 may send an INVITE message to the session control 31 with the session description protocol (SDP) of the client 6. The session control 31 may check the location database in the server 8 to authenticate the client 6 and to determine the location of the client 5. The session control 31 may then send an INVITE message to the called client 5 with the SDPs of the client 6 and the session relay 33. If the client 5 can receive the call from the client 6, the client 5 may send an OK message to the session control 31 with the SDP of the client 5. The session control 31 may forward the OK message to the client 6 with information on codec and the port of the session relay 33 so that the clients 5 and 6 can communicate with each other through the session relay 33.

After the session is established between the client 5 and 6, the clients 5 and 6 may send voice and/or video streams through the session relay 33 in the server 8 (step 65). For example, the client 6 may send the voice and/or video streams to the session relay 33, and the session relay 33 may forward the streams to the client 5. In a similar fashion, the client 5 may send the voice and/or video streams to the session relay 33, and the session relay 33 may forward the streams to the client 6. The session relay 33 may record the voice and/or video streams that pass the session relay 33. The session relay 33 may also obtain QoS statistics and calculate a MOS score of the session. The QoS statistics may include information on the latency of the packets passing the session relay 33 or other information regarding the quality of the session, such as the noise level of the signals passing the session relay 33.

The session relay 33 may forward the QoS statistics and MOS scores of the call to the session control 31 so that the session control 31 can produce session detail records of the call (step 67). The session detail records may include the QoS statistics and MOS scores of the call. The session detail records may also include other information on the call, such as the calling party address, the called party address, the call start time, the call end time, the call duration, etc. The session control 31 stores the session detail records 41 in a storage unit 13 (step 69). The session recordings are stored locally on the session relay 33 and the session manage 37 retrieves the recordings for mediation with the session detail records in the storage unit 12. A user can access the storage unit 12 to get the session detail records of the call. The session detail records 41 may also provide information about the amount billed for each call, the total usage time in the billing period, the total free time remaining in the billing period, and the running total charged during the billing period. The user can review the mediated session detail records via the Web browser provided by the session manage 37.

Figure 5:
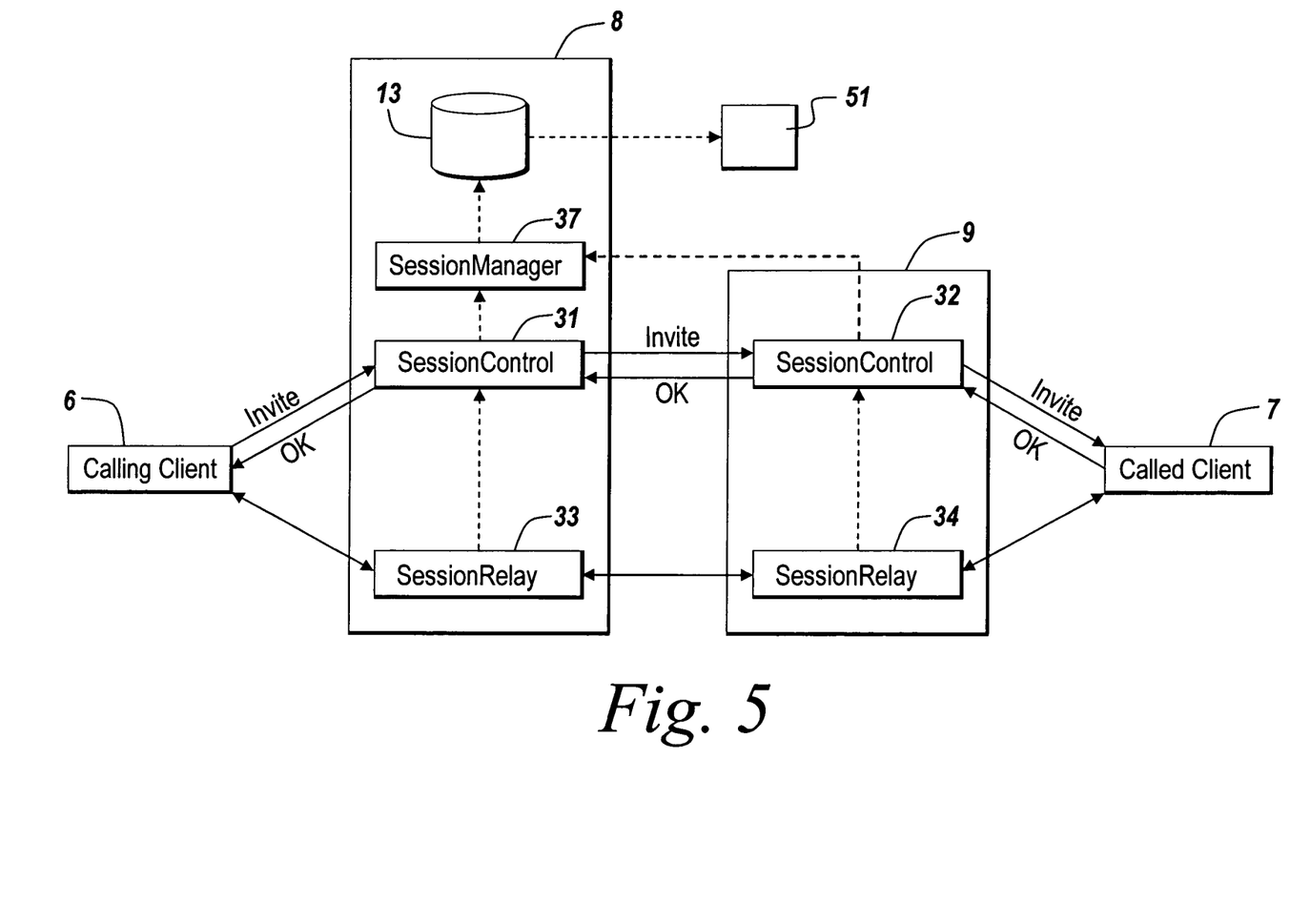
FIG. 5 depicts another exemplary configuration of the VoIP call connection in the illustrative embodiment.
Figure 7:
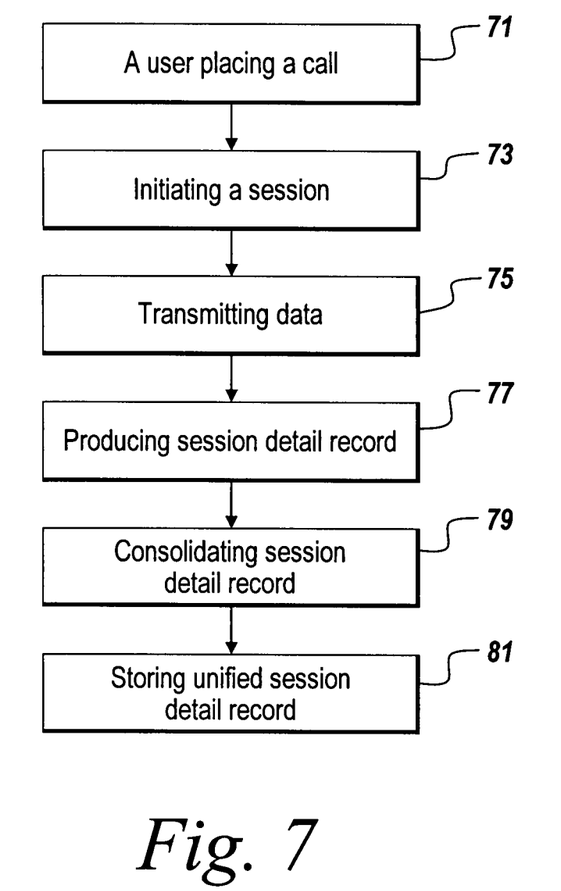
FIG. 7 is a flow chart showing an exemplary operation of the illustrative embodiment depicted in FIG. 5.

FIG. 5 shows another exemplary configuration in which a session is set up for a multi-hop call between the clients 6 and 7 in the illustrative embodiment, and FIG. 7 is a flow chart showing an exemplary operation of the illustrative embodiment depicted in FIG. 5. In the illustrative embodiment, the clients 6 and 7 may register with the session controls 31 and 32 in the servers 8 and 9, respectively. When a user places on the client 6 a call to a party who receives the call on the client 7 (step 71), the session controls 31 and 32 may set up a session between the clients 6 and 7 using the SIP protocol (step 73). The client 6 may send an INVITE message to the session control 31. The session control 31 may check the location database in the server 8 to authenticate the user. The session control 31 may then send an INVITE message to the session control 32 where the client 7 is registered so that the session control 32 can send an INVITE message to the client 7. If the client 7 can receive a call from the client 6, the client 7 may send an OK message to the session control 32. The session control 32 may then send an OK message to session control 31 so that the session control 31 can send an OK message to the client 6.

After the session is established between the client 6 and 7, the clients 6 and 7 may send voice and/or video streams through the session relays 33 and 34 in the servers 8 and 9, respectively (step 75). The client 6 may send the voice and/or video streams to the session relay 33 in the server 8, the session relay 33 may relay the streams to the session relay 34 in the server 9, and the session relay 34 may then forward the streams to the client 7. In a similar fashion, the client 7 may send the voice and/or video streams to the session relay 34 in the server 9, the session relay 34 may relay the streams to the session relay 33 in the server 8, and the session relay 33 may forward the streams to the client 6. The session relays 33 and 34 may record the voice and/or video streams passing the session relays 33 and 34, respectively. The session relays 33 and 34 may also obtain QoS statistics of the voice and/or video streams passing the session relays 33 and 34, respectively.

The session relays 33 and 34 may forward the QOS statistics of the signals to the session controls 31 and 32 so that the session controls 31 and 32 can produce session detail records of the call in the servers 8 and 9, respectively (step 77). A session manage 37 may collect the session detail records stored on the session controls 31 and 32 (step 79). The session manage 37 consolidates the session detail records of the call and stores the unified session records 51 in the storage unit 13 (step 81). The session recordings are stored locally on the session relays 33 and 34 and the session manage 37 retrieves the recordings for mediation with the session detail records in the storage unit 13. A user can access the storage unit 13 to get the unified session detail records of the multi-hop call. The unified session detail records of the present invention enable a user to obtain session detail records of the multi-hop call in a single server, and hence the user does not need to track down every server that switch or redirect the multi-hop call.

Figure 8:
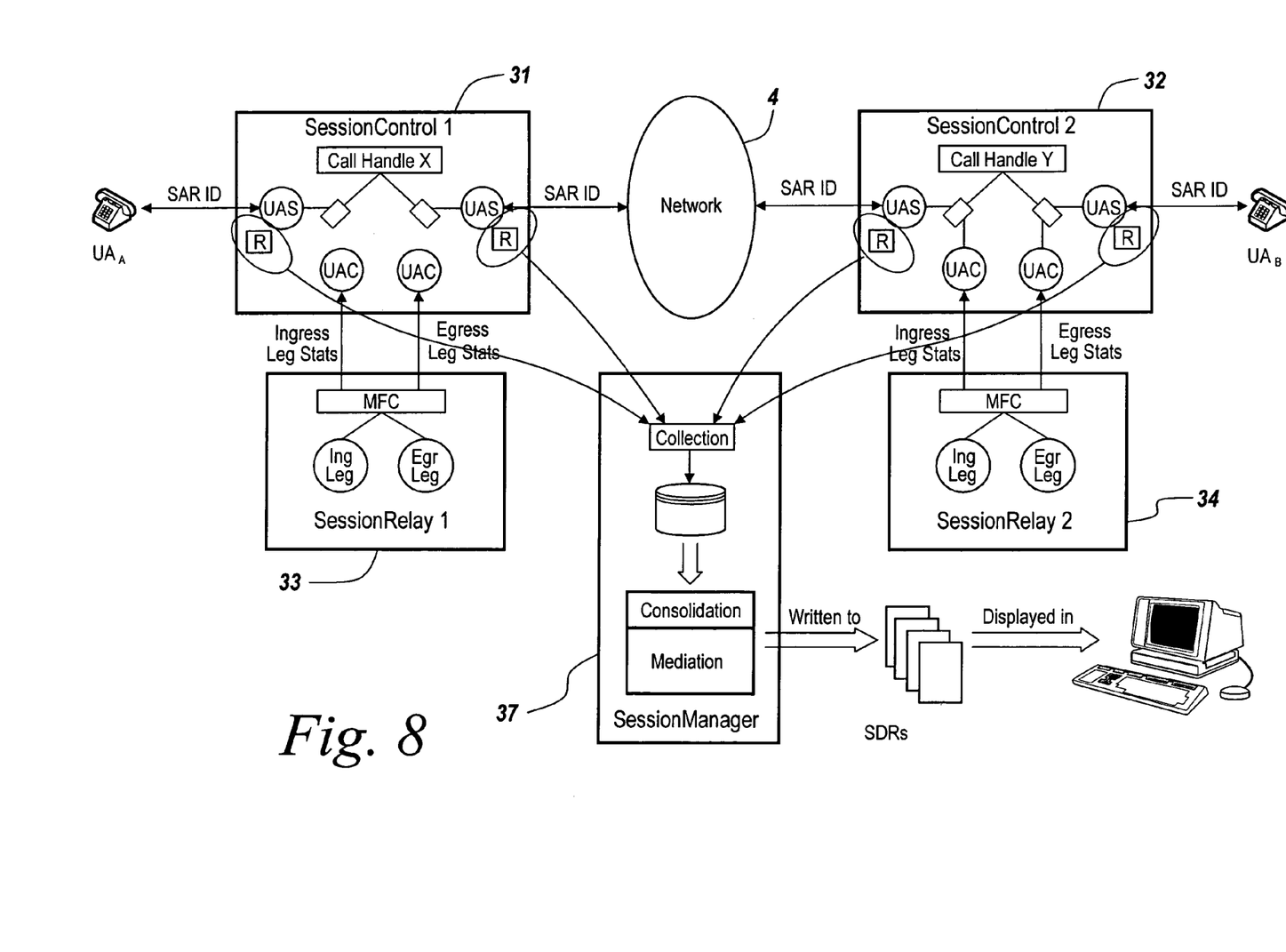
FIG. 8 is an exemplary that illustrates the creation and consolidation of session data records.

FIG. 8 depicts an exemplary diagram that illustrates the creation and consolidation of session data records. Although an exemplary embodiment is described with two session control hops, there is no limit to the number of call legs or session control hops that can be taken in completing a call. The same description may apply to call paths that traverse N number of session control hops.

A session data record (R) may be created for each leg of a SIP call within session controls 31 and 32. A call leg may consist of an ingress or egress connection per SIP dialogue. Session controls 31 and 32 may create session data records using information from internal resources and from statistics records received at the close of a session from session relays 33 and 34, such as the media fabric's ingress and egress leg statistics and QoS calculations.

Session controls 31 and 32 may create a data record (R) for the ingress leg (a leg from which the initial INVITE is received, and the egress leg (a leg where the INVITE is forwarded on toward a call destination). Session controls 31 and 32 may tag the records with a unique handle called a Session Application Record (SAR) identification. Session relays 33 and 34 may collect statistics and call state information for the call legs that are representative of the media flows in the Back-To-Back User Agent (B2BUA) dialogue with session controls 31 and 32. A data record may be created when an INVITE is received and written to a file when the call completes either as a result of connection and disconnection or as a result of an error during call setup.

In the embodiment shown in FIG. 8, eight distinct session data records may be created representing each of the call legs.

If the call is branched to an additional session control domain, two more dialogues and four more call legs may be created for the session (two on the second session control and two on the second session relay).

In addition to the statistics information created for the ingress and egress legs by session relays as part of a normal call setup, two additional sets of information representing additional call legs may be collected by session relay. One leg may be required to fulfill call recording policy and another for an external tap, e.g., in the case of a lawful intercept policy.

Figure 9:
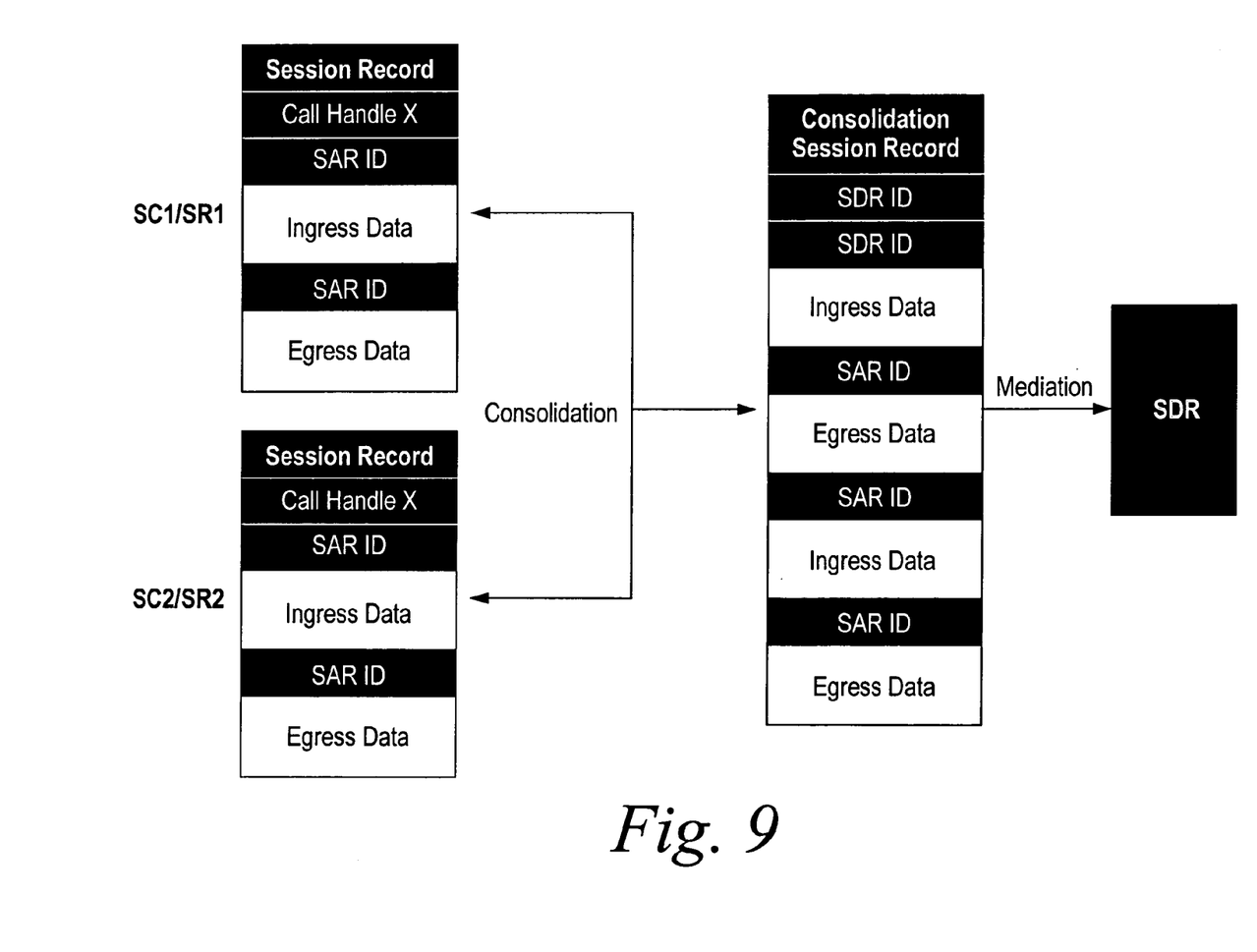
FIG. 9 is an example of consolidated and mediated form of the session data records generated in an exemplary embodiment.

The raw session data records may then be consolidated and stored on an external database for mediation. When a session is terminated, the session relays 33 and 34 may send the statistics to session controls 31 and 32 that bundle this data into a partially consolidated data record and forward this information to session manage 37. Once the individual data records have been collected, a post-processing activity may be applied to consolidate and normalize the various data records that makeup the end to end record of the call into more manageable subcomponents that can be mediated. Session manage 37 may then store this information in a database, such as a PostgreSQL database. The collection may occur in real-time but the information may not be available to users as fully formed session detail records until mediation occurs. FIG. 9 shows an example of the consolidated and mediated data of the session record created in the session control 31 and 32 and session relays 33 and 34 depicted in FIG. 8.

As discussed above, the session may be recorded. In this case, a tag may be added to the record the session relays 33 and 34 pass to session controls 31 and 32 indicating this fact. The actual recording may remain in a file on the session relay server. When the session detail record is mediated, a link may be displayed in the graphical user interface representation of the session detail record. By clicking on the link, session manage 37 may retrieve the file and display it using a media player.

Once the data records have been normalized and consolidated, they can be mediated into a single session detail record that can be read and displayed by session manage 37. Mediation is the process whereby consolidated data records belonging to separate session control domains are determined to be descriptive of the same call and merged together. The merging may happen if two consolidated records share the same SAR identification for a leg of the call. For this to work, SAR identifications may be globally unique, which can be mandated by the SIP standard.

Certain embodiments of the present invention are described above. It is, however, expressly noted that the present invention is not limited to these embodiments, but rather the intention is that additions and modifications to what is expressly described herein also are included within the scope of the invention. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for providing a unified record of a multi-hop session in a VoIP network, the method comprising the steps of:

establishing the multi-hop session between a calling party and a called party through at least a first node and a second node in the VoIP network, producing a first record of the multi-hop session in the first node including a data record for a first node ingress leg and a data record for a first node egress leg and storing the first record in the first node;

producing a second record of the multi-hop session in the second node including a data record for a second node ingress leg and a data record for a second node egress leg and storing the second record in the second node; and retrieving the first and second records from the first and second nodes, and consolidating and mediating the first record and the second record to provide the unified record of the multi-hop session, storing the unified record in a session manager database so that users access the unified record of the multi-hop session in a single database, and adding a tag to the unified record creating a link to enable retrieval of the unified record;

wherein data of the multi-hop session is transmitted using a Real Time Transport Protocol (RTP) and wherein consolidated data records belonging to separate session control domains are merged in real-time in response to determining that the records are descriptive of a common call.

2. The method of claim 1, wherein the unified records comprise information on at least one of a calling party, address, a called party address, a call start time, a call end time, a call duration, MOS (Mean Opinion Score) scores and quality of service (QoS) statistics.

3. The method of claim 1, wherein the session is established over the Internet and wherein the first record is created in response to a SIP INVITE message and written to a file when the multiple-hop session completes.

4. The method of claim 1, wherein the first node and the second node redirect the session and wherein the data records for each leg include call state information representative of media flow.

5. The method of claim 1, wherein the multi-hop session is initiated using a Session Initiation Protocol (SIP) and two sets of information representing a leg to fulfill a call recording policy and a leg for an external tap are collected.

6. The method of claim 1, further comprising the steps of:
recording the multi-hop session at the first leg; and
recording the multi-hop session at the second leg,
wherein the users play back the multi-hop session passing the first and second legs for troubleshooting of the multi-hop session.

7. The method of claim 1, further comprising the steps of:
merging the first record and the second record when the first record and the second record share the same Session Application Record (SAR) identification.

8. A non-transitory computer-readable storage medium holding computer executable instructions for providing unified records of a multi-hop session in a VoIP network, the medium comprising:
instructions for transmitting the multi-hop session from a calling party to a called party through at least a first node and a second node in the VoIP network,
instructions for producing a first record of the multi-hop session in the first node including a data record for a first node ingress leg and a data record for a first node egress leg and storing the first record in the first node;
instructions for producing a second record of the multi-hop session in the second node including a data record for a second node ingress leg and a data record for a second node egress leg and storing the second record in the second node; and
instructions for consolidating and mediating the first record and the second record to provide the unified records of the multi-hop session, and storing the unified records in a session manage database so that users access the unified records of the multi-hop session in a single database, and adding a tag to the unified record creating a link to enable retrieval of the unified record;

wherein data of the multi-hop session is transmitted using a Real Time Transport Protocol (RTP) and wherein consolidated data records belonging to separate session control domains are merged in real-time in response to determining that the records are descriptive of a common call.

9. The medium of claim 8, wherein the unified records comprise information on at least one of a calling party address, a called party address, a call start time, a call end time, a call duration, MOS (Mean Opinion Score) scores and QoS statistics.

10. The medium of claim 8, wherein the session is transmitted over the Internet.

11. The medium of claim 8, wherein the session comprises at least one of an audio data stream and a video data stream.

12. The medium of claim 8, wherein the first node and the second node redirect the session to forward it to the called party.

13. The medium of claim 8, wherein the multi-hop session is initiated using a Session Initiation Protocol (SIP).

14. The medium of claim 8, further comprising:
instructions for recording the multi-hop session at the first leg; and
instructions for recording the multi-hop session at the second leg,
wherein the users play back the multi-hop session passing the first and second legs for troubleshooting of the multi-hop session.

15. The medium of claim 8, further comprising:
instructions for merging the first record and the second record when the first record and the second record share the same Session Application Record (SAR) identification.

16. A system for providing unified records of a multi-hop session in a VoIP environment, the system comprising
a VoIP network for transmitting the multi-hop session from a calling party to a called party through at least a first node and a second node,
wherein the first node produces and stores at the first node a first record including a data record for a first node ingress leg and a data record for a first node egress leg of the multi-hop session and the second node produces and stores at the second node a second record including a data record for a second node ingress leg and a data record for a second node egress leg of the multi-hop session; and
a process for consolidating and mediating the first record and the second record to provide the unified records of the multi-hop session, and for storing the unified record in a session manage database so that users access the unified records of the multi-hop session in a single database, and for adding a tag to the unified record creating a link to enable retrieval of the unified record;

wherein data of the multi-hop session is transmitted using a Real Time Transport Protocol (RTP) and wherein consolidated data records belonging to separate session control domains are merged in real-time in response to determining that the records are descriptive of a common call.

17. The system of claim 16, wherein the unified records comprise information on at least one of a calling party address, a called party address, a call start time, a call end time, a call duration, MOS (Mean Opinion Score) scores and QoS statistics.

18. The system of claim 16, wherein the session is transmitted over the Internet.

19. The system of claim 16, wherein the session comprises at least one of an audio data stream and a video data stream.

20. The system of claim 16, wherein the first node and the second node redirect the session to forward it to the called party.

21. The system claim 16, wherein the process comprises a control process for initiating the multi-hop session using a Session Initiation Protocol (SIP).

22. The system of claim 16, wherein the process comprises a relay process for relaying the multi-hop session between legs of the multi-hop session.

23. The system of claim 22, further comprising:
a first relay process for recording the multi-hop session at the first leg; and
a second relay process for recording the multi-hop session at the second leg,
wherein the users play back the multi-hop session passing the first and second legs for troubleshooting of the multi-hop session.

24. The system of claim 16, wherein the process merges the first record and the second record when the first record and the second record share the same Session Application Record (SAR) identification.

* * * * *